United States Patent [19]
Ohno

[11] Patent Number: 5,933,676
[45] Date of Patent: *Aug. 3, 1999

[54] IMAGE FORMING APPARATUS, AND CONTROL APPARATUS AND METHOD THEREFOR

[75] Inventor: Takashi Ohno, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/916,928

[22] Filed: Aug. 22, 1997

[30] Foreign Application Priority Data

Aug. 23, 1996 [JP] Japan .................................. 8-222764

[51] Int. Cl.$^6$ ............................. G06F 15/00; G03G 15/00
[52] U.S. Cl. ............................. 399/8; 358/504; 395/114
[58] Field of Search .................... 399/8, 38, 44, 399/49, 75, 94; 340/500, 501, 825.06; 364/919.1, 920.7; 395/114; 358/504

[56] References Cited

U.S. PATENT DOCUMENTS

| | | | |
|---|---|---|---|
| 5,309,257 | 5/1994 | Bonino et al. | 358/504 |
| 5,386,276 | 1/1995 | Swales et al. | 399/8 |
| 5,404,201 | 4/1995 | Umeda et al. | 399/8 |
| 5,414,494 | 5/1995 | Aikens et al. | 399/8 X |
| 5,694,528 | 12/1997 | Hube | 399/8 X |

FOREIGN PATENT DOCUMENTS

| | | |
|---|---|---|
| 0680199 | 2/1995 | European Pat. Off. . |
| 0650291 | 4/1995 | European Pat. Off. . |
| 0654757 | 5/1995 | European Pat. Off. . |
| 0673155 | 9/1995 | European Pat. Off. . |

*Primary Examiner*—Sandra Brase
*Assistant Examiner*—Sophia S. Chen
*Attorney, Agent, or Firm*—Fitzpatrick, Cella, Harper & Scinto

[57] ABSTRACT

Calibration data is generated by an external device, and calibration of a printer is performed based on the calibration data. When a printer detects change in printing conditions, such as temperature, it transmits a calibration request and information on change in printing conditions (e.g., measured temperature) to an external device. The external device generates calibration data (e.g., data used for correcting density) on the basis of the information on the printing conditions, and calibration of the printer is performed on the basis of the calibration data.

19 Claims, 9 Drawing Sheets

| JOB NAME | NETWORK ADDRESS | STATUS |
|---|---|---|
| JOB 1 | 100.10.10 | PRINTING |
| JOB 2 | 100.10.11 | WAITING |
| JOB 3 | 100.10.12 | RECEIVING DATA |

IMAGE FORMING APPARATUS, AND CONTROL APPARATUS AND METHOD THEREFOR

BACKGROUND OF THE INVENTION

The present invention relates to an image forming apparatus, and control apparatus and method therefor and, more particularly, to an image forming apparatus which forms an image on the basis of image information provided from an external device, and a control apparatus and method for controlling the image forming apparatus.

When an image is outputted by a printer, quality of printed images may differ from each other depending, at different times, upon environmental conditions, such as temperature, and states of units and parts configuring a printer engine, which change with time, for example. Therefore, in order to maintain a steady quality of printed images, it is necessary to perform processing for correcting output characteristics of the printer engine, namely calibration, in accordance with the environmental conditions and state of the printer engine which changes, e.g., with the lapse of time. The calibration has become very important processing as resolution of printers increase and more printers print color images.

A conventional printer automatically performs calibration, therefore, a user does not know when the calibration is being executed. Further, the user can not instruct to initiate calibration at an arbitrary time.

Furthermore, since the conventional printer generates calibration data used in calibration, by itself, it is not possible to change the content of the calibration as the user desires.

However, there are cases where it is better for the user to manage execution of calibration. For example, in a case where a large number of pages are to be printed, by calibrating a printer before initiating the printing job, it is possible to prevent forced execution of calibration in the middle of the printing job.

Further, there are cases where it is better for an external device, such as a host computer, to generate calibration data. For example, in a case where a calibration mechanism of a printer is not good enough, by letting an external device generate proper calibration data and sending it to the printer, it is possible to perform calibration at high precision.

SUMMARY OF THE INVENTION

The present invention has been made in consideration of the above situation, and has as its object to diversify functions relating to calibration, and performing proper calibration.

According to the present invention, the foregoing object is attained by providing an image forming apparatus which forms an image on a recording medium on the basis of image information, the apparatus comprising: detection means for detecting change in status of a parameter which affects quality of an output image; and transmission means for transmitting information on status of the parameter to an external device in a case where the change in status of the parameter is detected.

The image forming apparatus preferably further comprises calibration execution means for executing calibration on the basis of an instruction for executing the calibration, received from the external device, issued in response to the transmission of the information on status of the parameter.

The instruction for executing calibration preferably includes density correction information used for correcting a density value included in the image information so as to reduce an effect of the change in status of the parameter on the quality of an output image.

The transmission means preferably includes means for transmitting the information on status of the parameter to the external device which is an originator of the image information.

The change in status of the parameter detected by said detection means includes change in temperature.

Further, the foregoing object is also obtained by providing an image forming apparatus which forms an image on the basis of image information, comprising: communication means for communicating with one or more external devices via a network; detection means for detecting change in status of a parameter which affects quality of an output image; and transmission means for transmitting information on status of the parameter to all or a part of the external devices connected to the network via the communication means in a case where the change in status of the parameter is detected.

The image forming apparatus preferably further comprises calibration execution means for executing calibration on the basis of an instruction for executing calibration received from one of the external devices via the communication means, issued in response to the transmission of the information on status of the parameter.

The communication means preferably transmits the information on status of the parameter, at least, to an external device, which is an originator of the image information, out of the external devices connected to the network during forming of the output image based on the image information.

The calibration execution means preferably executes calibration on the basis of the instruction for executing calibration received from an external device, which is an originator of the image information, out of the external devices connected to the network during forming the output image based on the image information.

The instruction for executing calibration preferably includes density correction information used for correcting a density value included in the image information so as to reduce an effect of the change in status of the parameter on the quality of an output image.

The image forming apparatus preferably further comprises notification means for, when executing calibration by the calibration execution means, sending a message indicating a notice of execution of calibration to all or a part of the external devices connected to the network via the communication means.

The change in status of the parameter detected by said detection means includes change in temperature.

Furthermore, the foregoing object is also attained by providing an image forming apparatus which forms an image on the basis of image information, comprising: calibration execution means for executing calibration for correcting change in quality of an output image; detection means for detecting change in status of a parameter which affects quality of an output image; and notification means for sending a message indicating a notice of execution of calibration to an external device in a case where the change in status of the parameter is detected.

The image forming apparatus preferably further comprising communication means for communicating with one or more external devices via a network, wherein the notification means sends a notice of execution of calibration to all or a part of the external devices via the communication means.

The image forming apparatus preferably further comprising transmission means for transmitting information on status of the parameter to all or a part of the external devices via the communication means in a case where a change in status of the parameter is detected.

The notification means preferably sends a notice of execution of calibration to the external devices except one of the external devices to which the transmission means transmits the information on status of the parameter.

The communication means preferably transmits the information on status of the parameter, at least, to an external device, which is an originator of the image information, out of the external devices connected to the network during forming the output image based on the image information.

The calibration execution means preferably executes calibration on the basis of an instruction for executing calibration received from one of the external devices via the communication means, issued in response to the transmission of the information on status of the parameter.

The change in status of the parameter detected by said detection means includes change in temperature.

Further, the foregoing object is also attained by providing a control apparatus for controlling an image forming apparatus via a communication path, comprising: reception means for receiving information on change in status of a parameter which affects quality of an image output by the image forming apparatus, from the image forming apparatus; deciding means for deciding whether or not to instruct execution of calibration to the image forming apparatus on the basis of the received information; and instruction means for instructing execution of calibration to the image forming apparatus in accordance with a decision by the deciding means.

The control apparatus preferably further comprising generation means for generating calibration data for reducing change in quality of an image outputted by the image forming apparatus on the basis of the information received by the reception means, wherein the instruction means transmits the generated calibration data to the image forming apparatus when instructing execution of calibration.

The change in status of the parameter includes change in temperature in the image forming apparatus.

Further, the foregoing object is also attained by providing a control method for controlling an image forming apparatus which forms an image on a recording medium on the basis of image information, the method comprising: a detection step of detecting change in status of a parameter which affects quality of an output image; and a transmission step of transmitting information on status of the parameter to an external device in a case where the change in status of the parameter is detected.

Further, the foregoing object is also attained by providing a control method for controlling an image forming apparatus which forms an image on the basis of image information and has a communication means for communicating with one or more external devices via a network, comprising: a detection step of detecting change in status of a parameter which affects quality of an output image; and a transmission step of transmitting information on status of the parameter to all or a part of the external devices connected to the network via the communication means in a case where the change in status of the parameter is detected.

Further, the foregoing object is also attained by providing a control method for controlling an image forming apparatus which forms an image on the basis of image information, comprising: a detection step of detecting change in status of a parameter which affects quality of an output image; a notification step for sending a message indicating a notice of execution of calibration to an external device in a case where the change in status of the parameter is detected; and a calibration execution step for executing calibration for correcting change in quality of an output image.

Further, the foregoing object is also attained by providing a control method for controlling an image forming apparatus via a communication path, comprising: a reception step of receiving information on change in status of a parameter which affects quality of an image output by the image forming apparatus, from the image forming apparatus; a deciding step of deciding whether or not to instruct execution of calibration to the image forming apparatus on the basis of the received information; and an instruction step of instructing execution of calibration to the image forming apparatus in accordance with a decision in said deciding step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will be described in detail below in accordance with the accompanying drawings.

Figure 1:
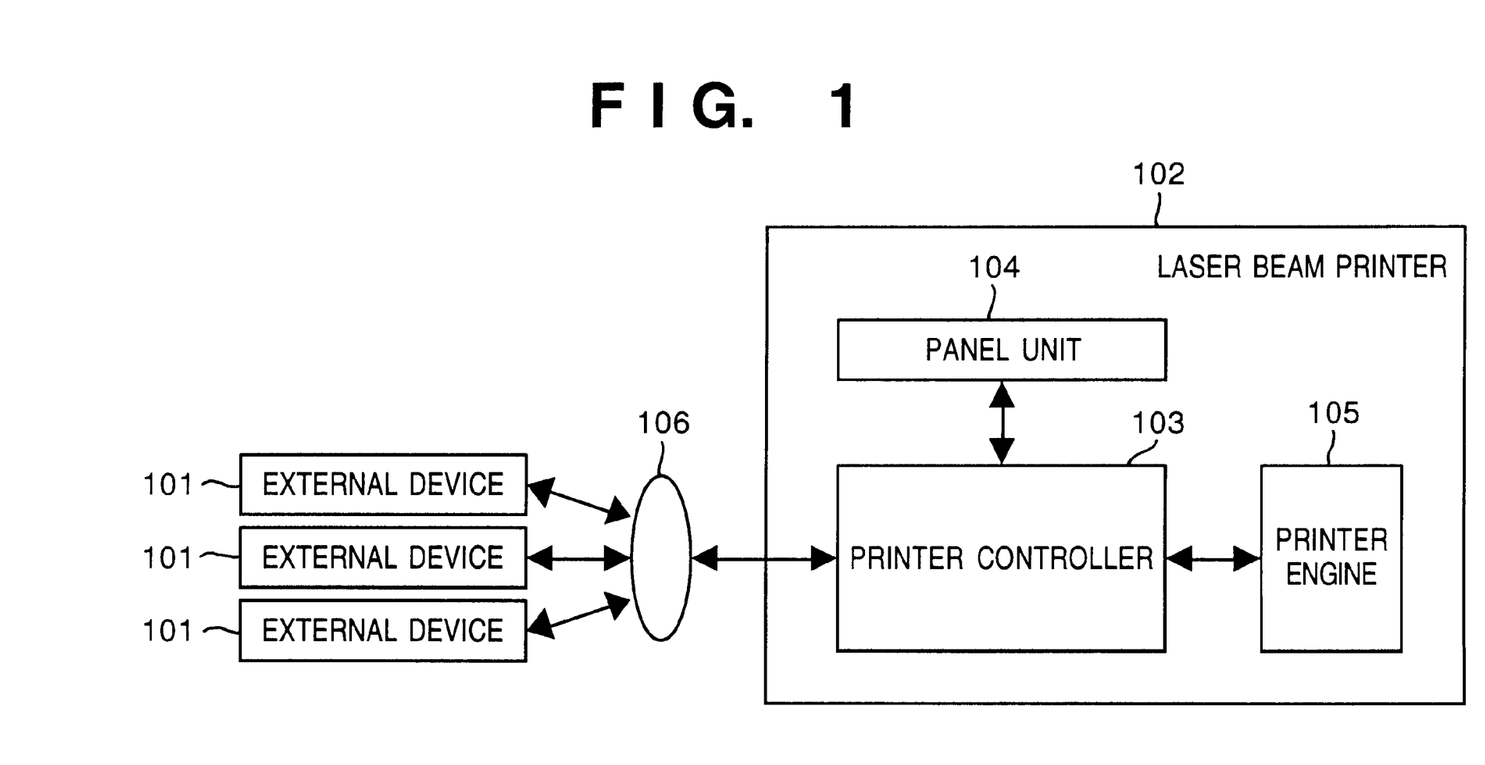
FIG. 1 is a block diagram illustrating a configuration of a printer system according to an embodiment of the present invention.

FIG. 1 is a block diagram illustrating a brief configuration of a printer system according to an embodiment of the present invention. The printer system includes a plurality of external devices 101 and a printer 102 connected via a network 106. The external devices 101 are, for example, computers, and they function as image information sources and as control devices of the printer 102. In this embodiment, a laser beam printer is used as the printer 102.

A printer controller 103 generates raster data by page on the basis of image information (e.g., in escape character codes (ESC) and page description language) supplied from the external devices, and outputs to a printer engine 105. Further, the printer controller 103 receives information on changes in printing conditions, such as environmental changes (e.g., temperature) and changes in internal conditions of the printer (e.g., remaining amount of toner), from the printer engine 105, and transmits the information to a panel unit 104 and the external devices 101, and executes calibration in response to an instruction from the panel unit 104 and the external devices 101.

The printer engine 105 forms a latent image on an electrostatic drum on the basis of the raster data provided from the printer controller 103, and the latent image is transferred and fixed on a recording medium (in an electrophotograph method), thereby printing an image.

The panel unit 104 is used as a user interface. By operating the panel unit 104, a user instructs a desired operation. For example, a message which advise to initiate calibration is displayed in accordance with the aforesaid changes in printing conditions. In response to the message, the user can instruct execution of calibration at a desired time.

Figure 2:
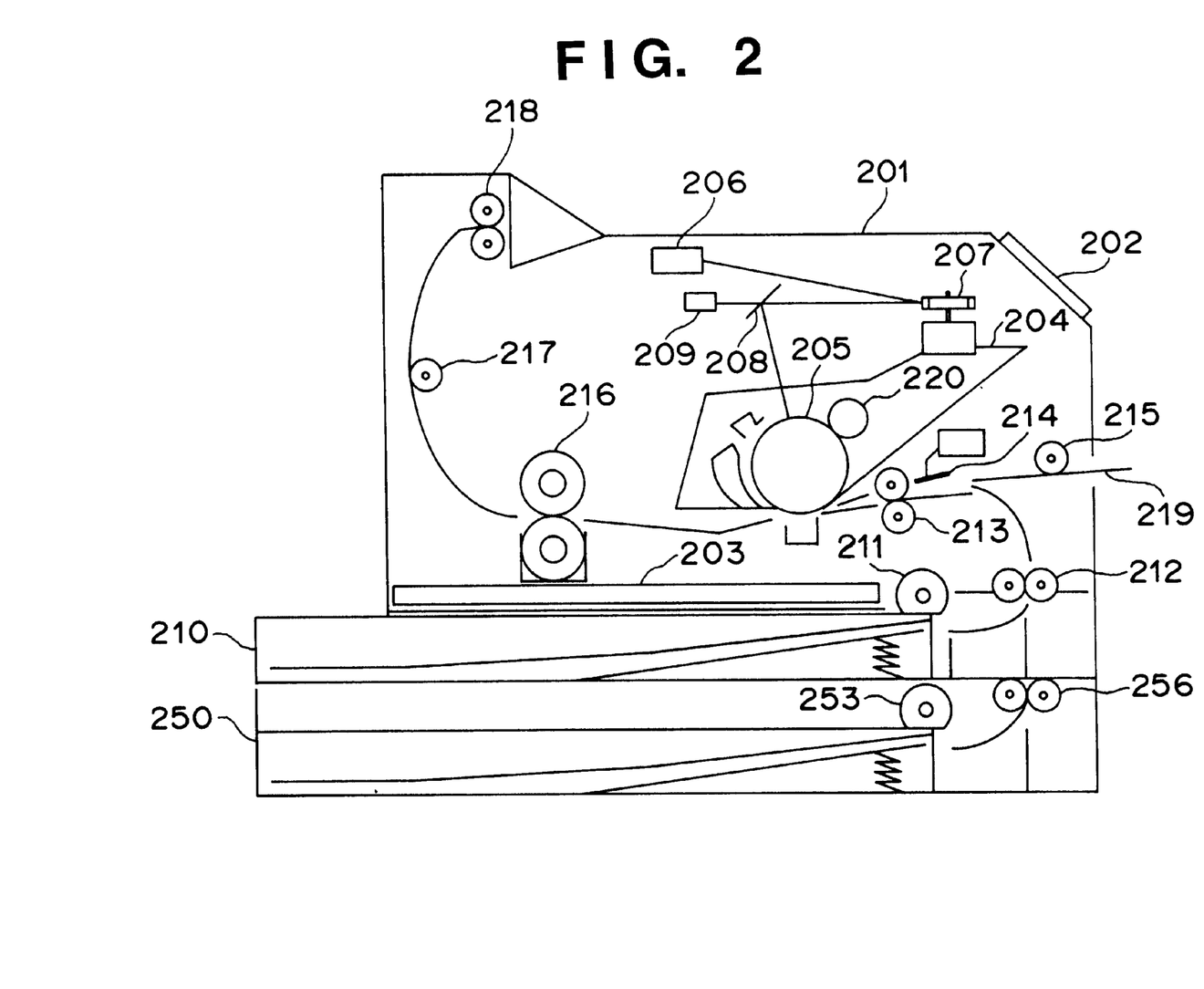
FIG. 2 is a cross sectional view showing an example of a configuration of a printer included in a printer system.

FIG. 2 is a cross sectional view showing an example of a configuration of the printer 102. Reference numeral 201 denotes a printer main body; 202, an operation panel, as an example of the panel unit 104, on which switches used by a user for inputting various instructions and an LED or LCD display, for example, for displaying messages and setting contents of the printer; and 203, a board space which accommodates boards configuring parts of electric circuits of the printer controller 103 and the printer engine 105.

Reference numerals 210 and 250 are paper feed cassettes having a mechanism for electrically detecting the size of a paper sheet based on a partition board (not shown); and 211 and 253, paper feed clutches, for respective paper feed cassettes, each of which has a cam, driven by power transmitted from a driving unit (not shown), for taking a paper sheet which is on the top of a stack of paper sheets in the paper feed cassette 210 or 250, and conveying the paper sheet to a paper feed roller 212 or 256, respectively. The cam rotates intermittently for each paper feed operation, and one rotation of the cam feeds one paper sheet. The paper feed roller 212 is for conveying the paper sheet until the front edge of the paper sheet reaches a regist shutter 214. The paper feed roller 256 is for conveying the paper sheet until the front edge of the paper sheet reaches the paper feed roller 212. Further, reference numeral 214 denotes the regist shutter, and it can stop paper feed operation by pressing the paper sheet.

Reference numeral 219 denotes a manual paper feed tray; and 215, a manual paper feed clutch. The manual paper feed clutch 215 is used for conveying a paper sheet until the front edge of the paper sheet reaches the regist shutter 214. A paper sheet to be printed is fed from a selected one out of the paper feed cassettes 210 and 250 and the manual paper feed tray 219.

The printer engine 105 communicates with the printer controller 103 using a predetermined communication protocol, and it selects one out of the paper feed cassettes 210 and 250 and the manual paper feed tray 219 in accordance with an instruction from the printer controller 103, and conveys a paper sheet from the selected paper feed cassette or tray to the regist shutter 214 in response to a print-start instruction. Note, the printer engine 105 includes paper feed means, a mechanism relating to electrophotographic processes, such as latent image forming, transferring and fixing, and discharging means, and control means therefor.

Further, reference numeral 204 denotes a cartridge including an electrostatic drum 205 and a toner container; 206, a laser unit; 207, a rotational polygon mirror; 208, a mirror, and 209, a beam detector. When a paper sheet is conveyed to the regist shutter 214, the laser unit 206 drives a built-in semiconductor laser to emit a laser beam on the basis of the raster data provided from the printer controller 103. The laser beam is reflected by the rotational polygon mirror 207 and the mirror 208, incident on the electrostatic drum 205, and forms a latent image. At this time, the laser beam scans the electrostatic drum 205 in the main scanning direction via the rotational polygon mirror 207.

In synchronization with the emission of the laser beam, the regist shutter 214 is moved upward, and the paper sheet to be printed is conveyed in synchronization with the scanning operation by the laser beam in the sub-scanning direction. The beam detector 209, provided at the start position of the scanning operation by the laser beam, generates a synchronizing signal used for determining start time for writing an image in the main scanning direction by detecting the laser beam, and sends it to the printer controller 103.

Upon transferring an image, a paper sheet to be printed is conveyed by a conveying roller 213, while the electrostatic drum 205 is driven to rotate by a motor (not shown) in the sub-scanning direction. Each of latent images sequentially formed on the electrostatic drum 205 is developed by a developing unit 220, and after it is visualized as a toner image, transferred to the paper sheet which is in contact with the electrostatic drum 205. The toner image transferred to the paper sheet is fixed by heat fusing by a fixing roller 216. After the toner image is fixed on the paper sheet, the paper sheet is discharged onto a paper-discharge tray, provided outside of the printer main body 201, via a conveying roller 217 and a discharging roller 218.

The printer 102 may be equipped with optional devices, such as an optional cassette and an envelope feeder.

Figure 3:
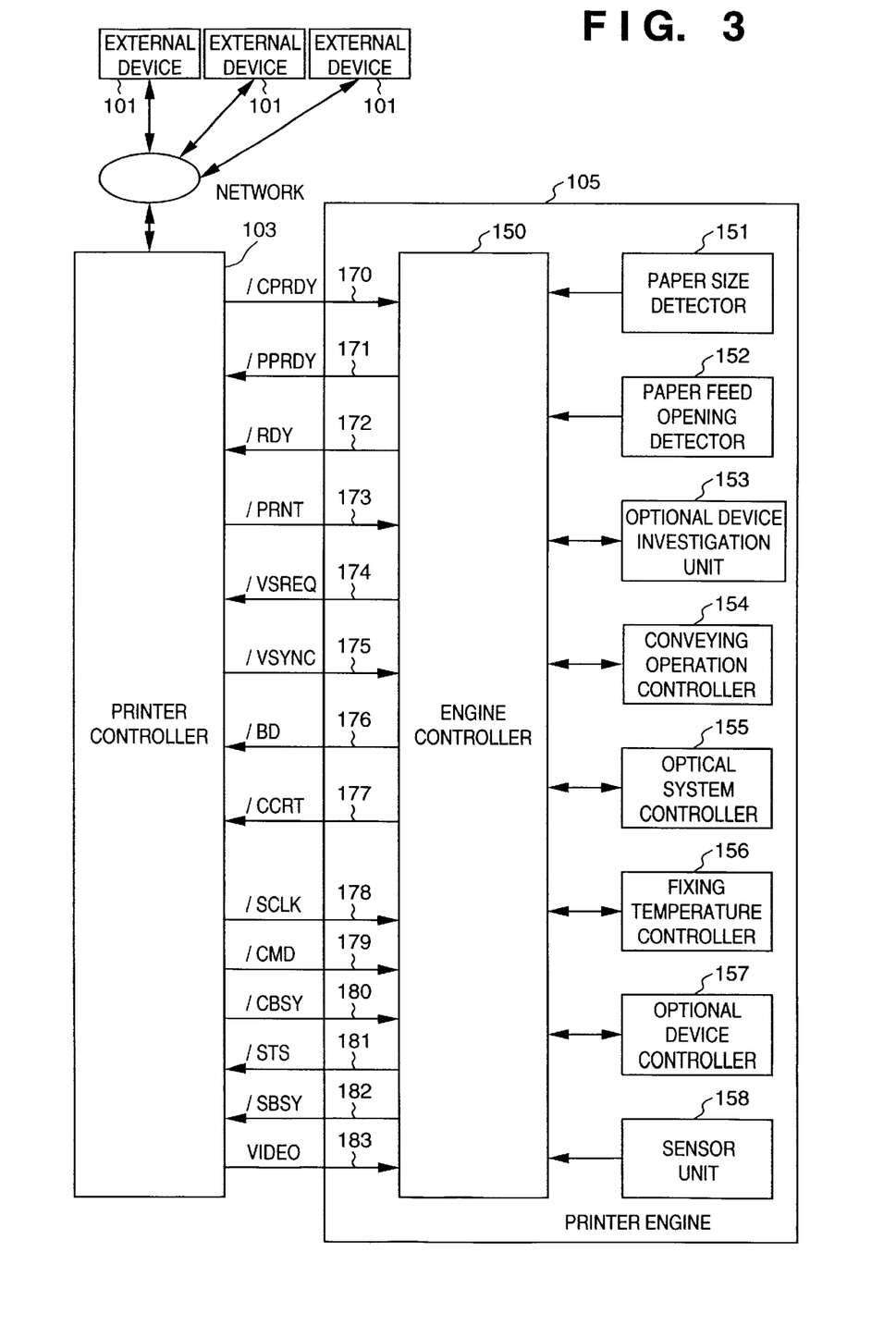
FIG. 3 is a block diagram illustrating a configuration of a video interface which connects a printer controller and a printer engine, and the printer engine.

FIG. 3 is a block diagram illustrating a configuration of a video interface which connects the printer controller 103 and the printer engine 105, and the printer engine 105.

The printer controller 103 performs communication with the plurality of external devices 101 (including reception of image information), generation of raster data on the basis of received image information, and control of the printer engine 105.

An engine controller 150 controls units 151 to 158 in the printer engine 105 in accordance with control signals provided from the printer controller 103.

The units 151 to 158 are independently explained below. Reference numeral 151 denotes a paper size detector for detecting size of paper sheets placed in the paper feed cassettes 210 and 250, the manual paper feed tray 219, and other optional cassette (not shown), then notifying the detected size to the engine controller 150; 152, a paper feed opening detector for detecting whether or not there are paper feed openings of the paper feed cassettes 210 and 250, the manual paper feed tray 219, an optional cassette (not shown), and an envelope feeder (not shown), and informing the detected results to the engine controller 150; 153, an optional device investigation unit for checking condition of connection of optional devices, such as an optional cassette and an envelope feeder; 154, a conveying operation controller for controlling conveying operation of a paper sheet; 155, an optical system controller for controlling an optical system, such as a driving motor for the rotational polygon mirror 207 and a laser unit 206; 156, a fixing temperature controller for controlling temperature of the fixing roller 216 as well as detecting abnormal states of the fixing roller 216; 157, an optional device controller for controlling optional devices, such as an optional cassette and an envelope feeder; and 158, a sensor unit for detecting whether or not there is a paper sheet in a conveying path, such as a regist unit, paper-discharging path, a refed tray for double sided printing, and a reverse path, and also detecting changes in environmental conditions (changes in printing conditions), such as changes in external temperature, the number of pages to be printed, and the remaining amount of toner.

Next, signal lines configuring the video interface which connects the printer controller 103 and the engine controller 105 are briefly explained. A signal line 170 is for a /CPRDY signal showing that the printer controller 103 is ready for communicating with the engine controller 105; 171, a /PPRDY signal showing that the engine controller 150 is ready for communicating with the printer controller 103; 172, a /RDY signal showing that the printer engine 105 is ready for printing; 173, a /PRNT signal for the printer controller 103 to issue a print request to the engine controller 150; 174, a /VSREQ signal for the engine controller 150 to request a vertical synchronizing signal to the printer controller 103; 175, a /VSYNC signal as the vertical synchronizing signal outputted from the printer controller 103 to the engine controller 150; 176, a /BD signal as a horizontal synchronizing signal outputted from the engine controller 150 to the printer controller 103; 178, a /SCLK signal as a synchronizing clock signal for serial communication; 179, a /CMD signal as a command signal for transmitting a command from the printer controller 103 to the engine controller 150; 180, a /CBSY signal as a strobing signal for transmitting a command; 181, a /STS signal for responding to the command (including internal states of the printer engine 105) transmitted form the printer controller 103; 182, a /SBSY signal as a strobing signal for transmitting a response, such as a status; and 183, and a VIDEO signal as raster data.

Further, a signal line 177 is for a /CCRT (Condition Change Report) signal which becomes "TRUE" when a state of the printer engine 105 changes without directly affecting the /RDY signal, namely, when the changed state does not directly relate to whether or not a printing operation can be performed (e.g., when temperature, the number of pages to be printed, and/or the remaining amount of toner is lower than a reference value).

Figure 4:
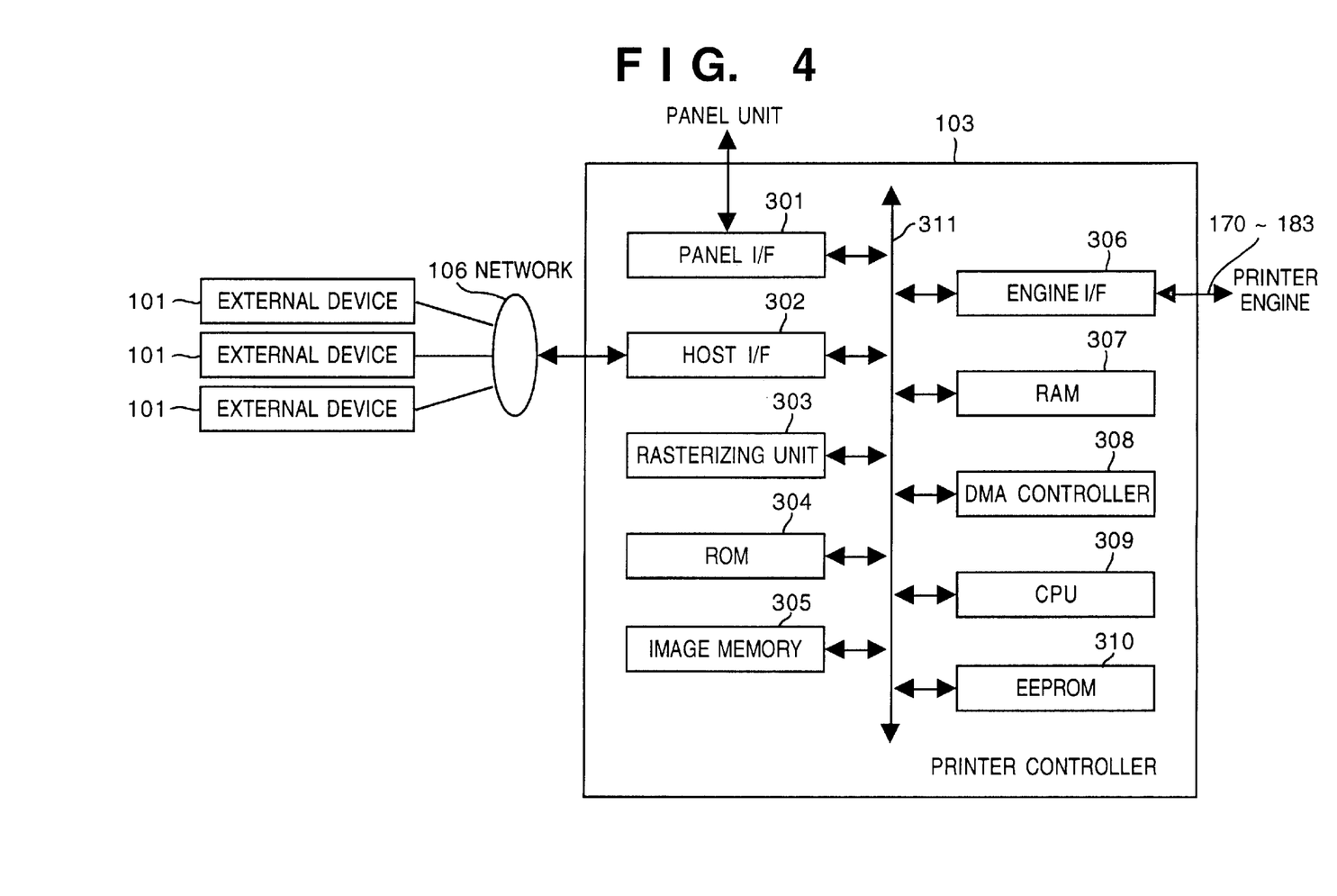
FIG. 4 is a block diagram illustrating a configuration of the printer controller.

FIG. 4 is a block diagram illustrating an example of a configuration of the printer controller 103. In FIG. 4, reference numeral 301 denotes a panel interface (I/F) for performing data communication with the panel unit 104. A CPU 309 can recognize content, set and instructed by a user through the panel unit 104, via the panel interface 301. Reference numeral 302 denotes a host interface (I/F) for connecting with the plurality of external devices 101, such as host computers, in bidirection via the network; and 306, an engine interface (I/F) for connecting with the printer engine 105. The CPU 309 can controls the signals 170, 173, 175, 178, 179 and 180, and obtain the statuses of the signals 171, 172, 174, 176, 177, 181 and 182, namely the state of the printer engine 105.

Reference numeral 303 denotes a rasterizing unit for generating raster data (rasterizing) to be provided to the printer engine 105 on the basis of image information supplied from the external devices 101; 305, an image memory for temporarily storing the generated raster data; 309, the CPU for controlling devices connected to a CPU bus 311 in accordance with control program codes stored in a ROM 304; 307, a RAM, as a storage memory used by the CPU 309; 310, an EEPROM configured with a non-volatile memory for storing control information, such as a density correction table, for example; and 308, a DMA controller which transmits the raster data stored in the image memory 305 to the engine interface 306 in response to the instruction from the CPU 309.

Further, reference numeral 311 denotes the CPU bus including address, data and control buses. The panel I/F 301, the host I/F 302, the rasterizing unit 303, the ROM 304, the image memory 305, the engine I/F 306, the RAM 307, the DMA controller 308, the CPU 309 and the EEPROM 310 are connected to the CPU bus 311, and the CPU 309 can access any devices connected to the CPU bus 311.

Figure 5:
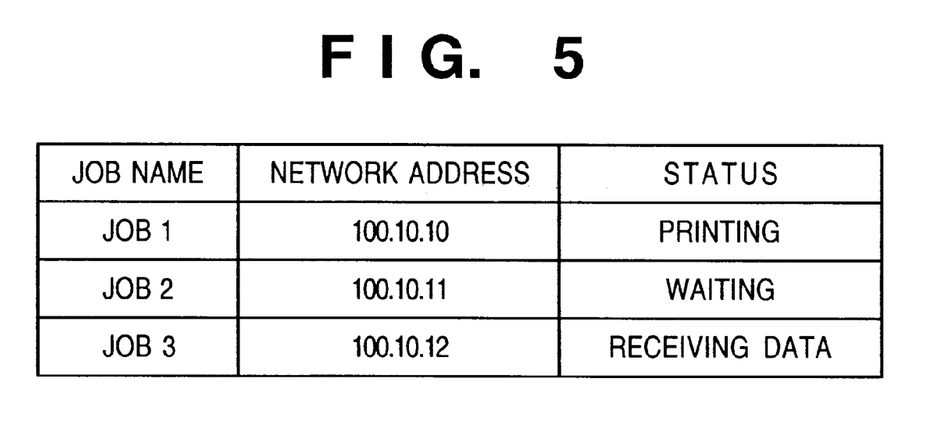
FIG. 5 is a table showing an example of a job management table for managing a plurality of printing jobs.

FIG. 5 is a table showing an example of a job management table for managing a plurality of printing jobs. The job management table is stored in a predetermined area of the RAM 307, and includes "job name" which is currently registered, "network address" for specifying one of the external devices 101 which requested the job, and "status" of the job. In the example shown in FIG. 5, "job 1" is a job requested by one of the external devices 101 having a network address of "100.10.10", and is an under printing operation. Further, "job 2" is a job requested by one of the external devices 101 having a network address of "100.10.11", and is in a waiting queue of a printing operation, and "job 3" is a job requested by one of the external devices 101 having a network address of "100.10.12", and the printer is currently receiving data. The job management table is updated at any time by an interruption routine, for instance, as the jobs process.

Figure 6:
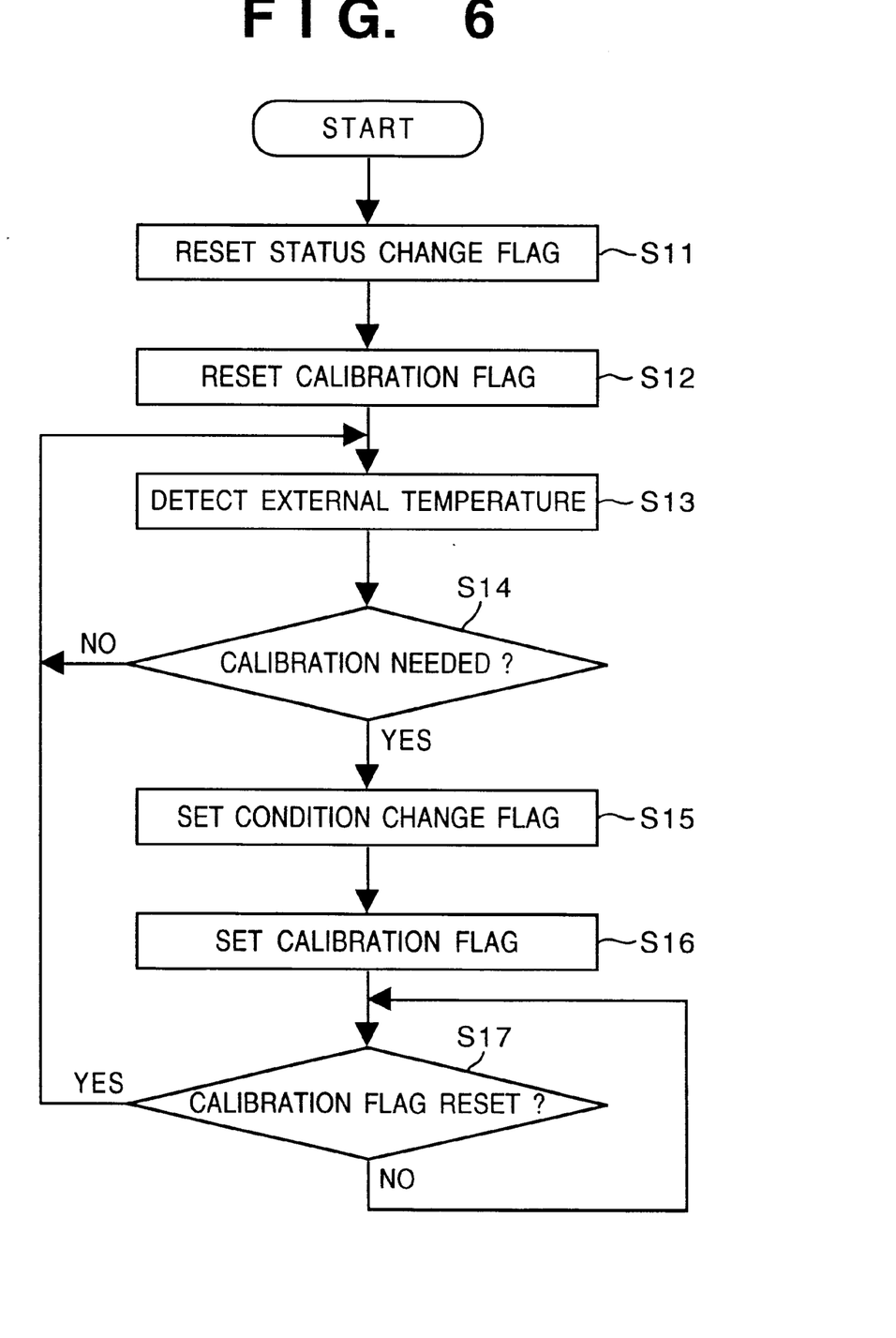
FIG. 6 is a flowchart showing condition supervising processing performed in an engine controller.

The engine controller 150 supervises an occurrence of changes in printing conditions (e.g., change in temperature and remaining amount of toner), which requires calibration, at any time. When any change in printing conditions occur, the engine controller 150 notifies information on the change in printing conditions to the printer controller 103. This process is called "condition supervising processing", hereinafter.

FIG. 6 is a flowchart showing the condition supervising processing in an engine controller 150. When the power is turned on, the engine controller 150 resets a condition change flag and a calibration flag in steps S11 and S12, respectively.

The condition change flag is set when changes in printing conditions which do not directly affect the /RDY signal 172 (e.g., temperature, the number of pages to be printed, and/or remaining amount of toner is less than a reference value) occur, namely, when changes which do not affect availability of a printing operation occur. The signal value of the /CCRT signal 177 directly reflects the signal value of the condition change flag. In other words, by controlling the signal value of the condition change flag, it is possible to control the signal value of the /CCRT signal 177. Note, the condition change flag is also set in other processings (e.g., processing for supervising the remaining amount of toner) besides the status supervising processing when other condition changes (e.g., shortage of remaining toner) are detected.

Further, the calibration flag is set when any change in printing conditions which require calibration occur.

In step S13, in order to detect occurrence of change in printing conditions which requires calibration, changes in parameters (e.g., external temperature and the number of pages to be printed) which may affect the quality of printed images are checked. Note, the flowchart in FIG. 6 shows an example when the external temperature is closely supervised as one of the above parameters.

In step S14, whether the external temperature, the parameter, has changed so that calibration is required or not is determined. When it is determined that the calibration needs to be performed, the process proceeds to step S15.

In step S15, the signal level of the /CCRT signal 177 is controlled by setting the condition change flag so as to notify the occurrence of change in printing conditions in the printer engine 105 to the printer controller 103. Then in step S16, the calibration flag is set. The printer controller 103 recognizes the necessity of calibration by checking the calibration flag being set. After the printer controller 103 executes calibration of the printer engine 105, it resets the calibration flag. Note, in the embodiment, the printer controller 103 issues a reset instruction of the calibration flag to the printer engine 105, and the calibration flag is reset in response to the reset instruction.

In step S17, the process waits until the calibration flag is reset, then returns to step S13 and starts monitoring change in parameters (i.e., change in a printing condition requiring calibration).

Figure 7:
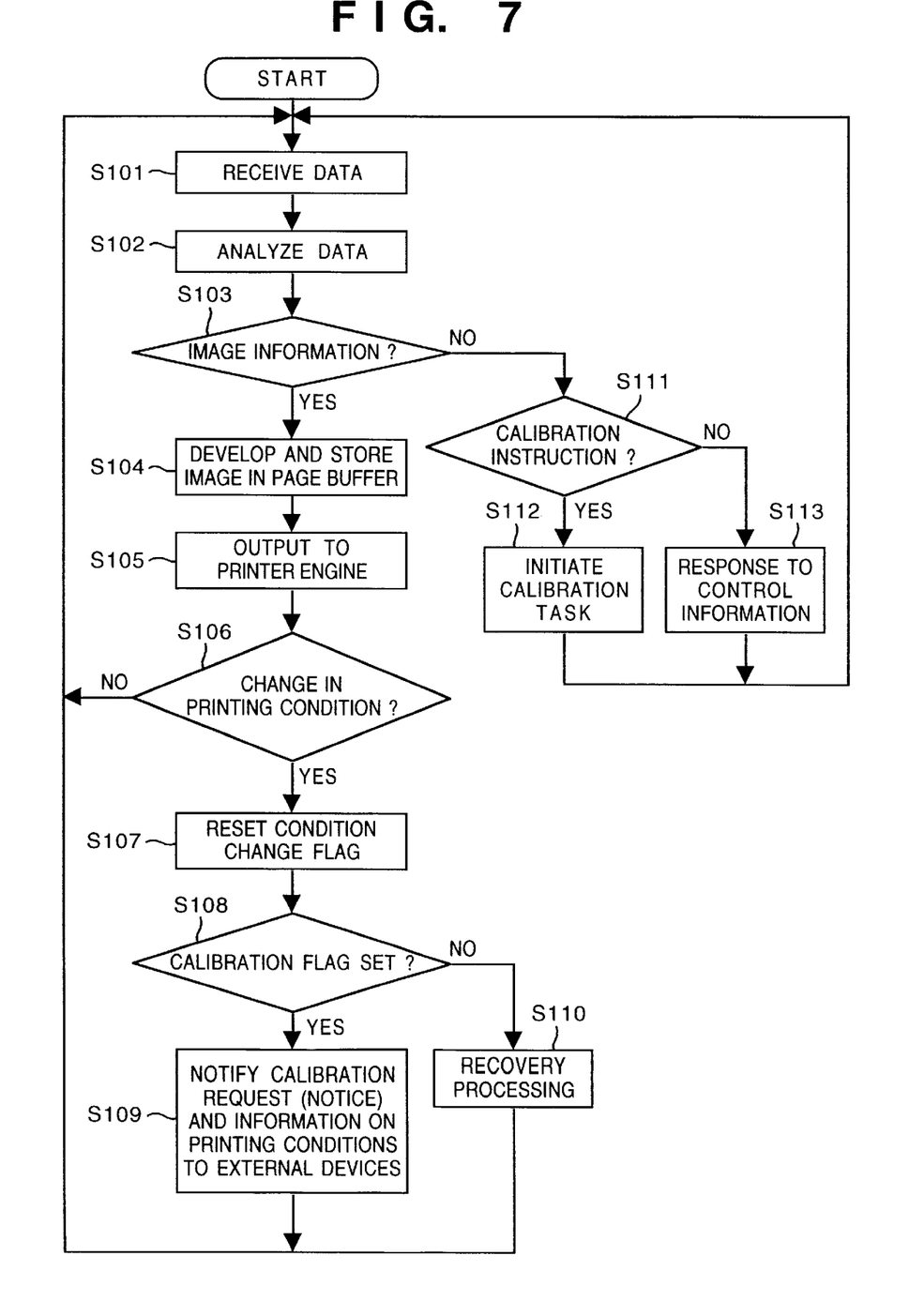
FIG. 7 is a flowchart showing processing performed in the printer controller.

FIG. 7 is a flowchart showing processing performed in the printer controller 103. Note, the processes shown in the flowchart in FIG. 7 are executed by the CPU 309 in accordance with a control program stored in the ROM 304.

After power is turned on, and the printer becomes ready for printing, the printer controller 103 inquires whether or not there is any receiving request from any of the external devices 101 connected to the host interface 302. Then when the printer controller 103 recognizes a receiving request, the processing shown in FIG. 7 is initiated.

First in step S101, data is received from one of the external devices 101 via the host interface 302 and sequentially written in an area reserved for received data in the RAM 307. In step S102, the received data is analyzed. Here, the received data is classified into image information and control information. The following explanation is based on the assumption that control information includes a calibration instruction for instructing to execute calibration of the printer engine 105.

In step S103, whether the received data is image information or control information is determined on the basis of the analysis, and if the received data is image information, then the process proceeds to step S104, whereas if the received data is control information, the process proceeds to step S111.

In step S104, an image corresponding to the image information is developed (rasterized) and stored in the page buffer of the RAM 307. Note, the development is performed on a page basis. After developing an image of a single page in the page buffer, image data is sequentially read from the page buffer in step S105, and transmitted to the printer engine 105 via the VIDEO signal line 183. The printer engine 105 prints an image on a paper sheet on the basis of the transmitted data, and discharge the paper sheet.

In step S106, by checking whether or not the level of the /CCRT signal 177 is "TRUE", and whether or not any printing condition has changed is checked. If there is not any change in printing conditions, the process returns to step S101. Whereas if there is, the process proceeds to step S107.

In step S107, by transmitting a reset instruction of the condition change flag to the printer engine 105 via the /CMD signal line 179, the condition change flag is reset, namely, the level of the /CCRT signal 177 is changed to "FALSE".

In step S108, the printer controller 103 inquires as to details of the change in printing conditions to the printer engine 105 via the /CMD signal line 179. In response to the inquiry, the printer engine 105 response to the printer controller 103 via the /STS signal line 181. As the response to the inquiry, the printer engine 105 sends information on the level of the calibration flag and condition information on the status of parameters (e.g., external temperature, such as "external temperature=35° C.").

In a case where the calibration flag is set, namely in a case where calibration needs to be performed, in the step S109 the printer controller 103 notifies that a calibration request (or notice of calibration) is being received and information on printing conditions to the external devices 101.

As for methods for notifying the calibration request, there are:

(1) Method for notifying the calibration request to all the external devices 101 on the network; and (2) Method for checking the job management table, and if there is any printing job currently being performed, notifying of the calibration request (permitting calibration) to the external device 101 which requested the printing job and notifying of notice of calibration (notice of possibility that calibration may be performed) to the other external devices 101, whereas, if there is no printing job currently being performed, notifying of the calibration request to all the external devices 101, for example.

In the method (1), the printer controller 103 executes calibration in accordance with a calibration instruction from one of the external devices 101 on the network. In the method (2), the printer controller 103 executes calibration in accordance with a calibration instruction from one of the external devices 101 which requested a printing job currently being performed.

Whereas, if it is determined in step S108 that the calibration flag is not set, namely, if it is not necessary to perform calibration, then in step S110, a recovery processing (e.g., displaying a message indicating contents of change in printing conditions) for making the printer engine 105 proper is performed.

Figure 8:
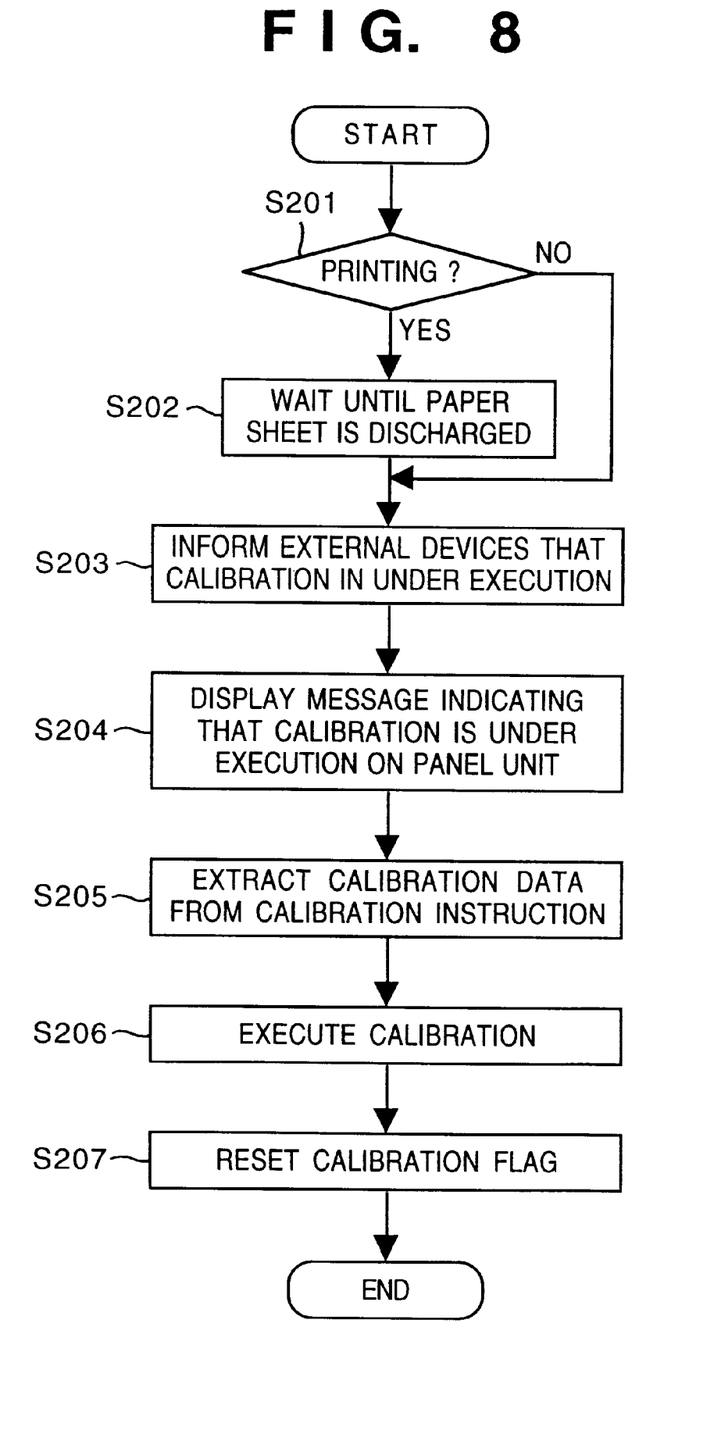
FIG. 8 is a flowchart showing a flow of calibration tasks.

If it is determined "NO" in step S103, namely, in a case where it is determined that the received data is control information, whether or not the control information is a calibration instruction requesting execution of calibration is determined in step S111. If the control information is the calibration instruction, then in step S112, calibration task shown by a flowchart in FIG. 8 is initiated. Whereas, if it is not the calibration instruction, then in step S113, a process of responding to the control information is performed. After either step S112 or S113, the process returns to step S101.

The calibration task is performed in parallel to the processing shown in FIG. 7. The processing of the calibration task is explained with reference to FIG. 8.

When the calibration task is initiated, first in step S201, whether or not there is a printing job currently being performed is determined by referring to the job management table. If there is a job currently being performed, then in step S202, the process waits until a paper sheet which is currently being printed (or until all the pages of the printing job is outputted) is discharged, then proceeds to step S203.

In step S203, a message indicating that calibration is under execution is reported to the external devices 101. It should be noted that the destination of the message may be all the external devices 101 on the network, or those which are currently registered on the job management table, or the one which issued a calibration instruction, or may be determined based on other rules.

In step S204, a message indicating that the calibration is under execution is displayed on the panel unit 104.

In step S205, calibration data is extracted from the calibration instruction. The calibration data is generated by one of the external devices 101 on the basis of the information on printing conditions, and is used for executing the calibration in the printer 102. Further, the calibration data is for correcting density of the image data provided from the printer controller 103 so as to reduce deterioration of output images caused by the change in printing conditions.

In step S206, calibration of the printer engine 105 is executed on the basis of the calibration data.

In step S207, by informing a reset instruction of calibration flag to the printer engine 105, the calibration flag is reset, thereby an operation relating to the calibration is completed.

Figure 9:
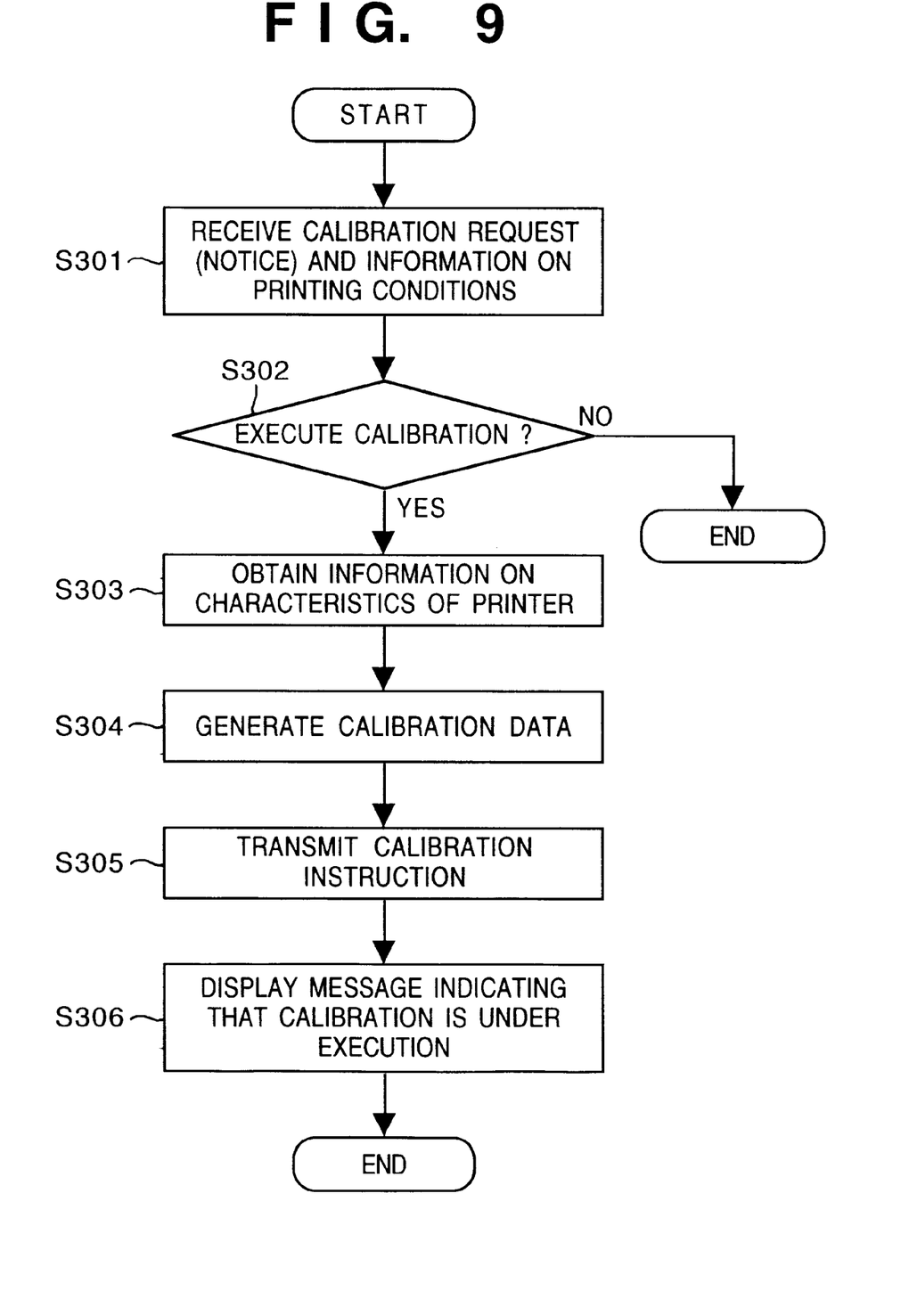
FIG. 9 is a flowchart showing an operational sequence of an external device relating to calibration.

FIG. 9 is a flowchart showing an operational sequence of one of the external devices 101 relating to calibration.

First in step S301, the external devices 101 receives a calibration request (or notice) and information on printing conditions from the printer 102. Then in step S302, whether or not to perform calibration is determined. More specifically, the external devices 101 display messages indicating that they received the calibration request (or notice) on their display units, such as a CRT, and prompt a user to enter instructions. In response, if a user instructs to execute calibration, the process proceeds to step S303, whereas if not, the process ends (i.e., no calibration instruction is issued). Note, in a case where an external device 101 receives a notice of calibration from the printer 102, since the external device 101 is not permitted to issue a calibration instruction, it is preferred to forcibly terminate the processing after the message is displayed (i.e., "NO" in step S302).

In step S303, information on characteristics of the printer 102 is obtained. The information on characteristics of the printer 102 may be obtained by inquiring about the information to the printer 102 or by reading the contents registered in, e.g., a memory in each external device 101 registered in advance.

In step S304, calibration data is generated on the basis of the information on printing conditions and information on characteristics of the printer 102. For example, if the information on printing conditions is on measured temperature and the information on characteristics of the printer 102 is about a relationship between temperature and density correction values, a density correction value corresponding to the measured temperature is used as calibration data.

In step S305, a calibration instruction including the calibration data is transmitted to the printer 102. Then in step S306, a message indicating that calibration is under execution is displayed for a predetermined time period in accordance with a response (step S203) from the printer S102.

According to the embodiment as described above, change in printing conditions which require calibration is detected, and a calibration request (notice) is sent to the external devices 101 on the network. Therefore, the external devices 101 (or user) recognizes the necessity of executing calibration on the basis of the calibration request (notice). Further, it is possible to instruct execution of calibration at an arbitrary time.

Further, since it is possible to instruct execution of calibration from the external devices 101, it is possible to instruct execution of calibration before executing a printing job during editing of a document, for example.

Furthermore, the information on printing conditions is transmitted to the external devices 101 when calibration needs to be performed, the external devices (or users) recognize the conditions of the printer 102. In addition, it is possible to generate proper calibration data and instruct execution of calibration on the basis of the calibration data.

Further, since calibration data is generated in the external devices 101, it is easy to update (change) rules for generating calibration data (e.g., the process in step S304 in FIG. 9).

Further, since calibration data is generated in the external devices which generally have better operation ability than a printer, it is possible to generate optimized calibration data on the basis of conditions of the printer, thereby maintaining output characteristics of the printer at a high quality.

It should be noted that, in the above embodiment, when calibration needs to be performed, a printer may inform the external devices 101 of a notice of calibration only, generate calibration data by itself and perform calibration.

Furthermore, the above explanation is about a case of using a laser printer, however, other printers, such as an ink-jet printer, may be used instead.

Further, the present invention may be broadly applied to image forming apparatuses, such as a facsimile machine, a copying machine, and an integrated apparatus of a facsimile machine, a copying machine and a printer, which require calibration. Furthermore, the present invention may be applied to either monochromatic image forming apparatuses or color image forming apparatuses.

The present invention can be applied to a system constituted by a plurality of devices (e.g., host computer, interface, reader, printer) or to an apparatus comprising a single device (e.g., copying machine, facsimile machine).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiment are realized by executing the program codes which are read by a computer, the present invention includes a case where an OS (operating system) or the like working on the computer performs a part or the entire processes in accordance with designations of the program codes and realize functions according to the above embodiment.

Furthermore, the present invention also includes a case where, after the program codes read from the storage medium are written in a function expansion card which is inserted into the computer or in a memory provided in a function expansion unit which is connected to the computer, a CPU or the like contained in the function expansion card or unit performs a part or the entire process in accordance with designations of the program codes and realizes functions of the above embodiment.

According to the present invention, functions relating to calibration are diversified, and proper calibration is performed.

The present invention is not limited to the above embodiments and various changes and modifications can be made within the spirit and scope of the present invention. Therefore to appraise the public of the scope of the present invention, the following claims are made.

What is claimed is:

1. An image forming apparatus which forms an image on a recording medium on the basis of image information, said apparatus comprising:

detection means for detecting change in status of a parameter which affects quality of an output image; and transmission means for transmitting information on status of the parameter to an external device in a case where the change in status of the parameter is detected, wherein the instruction for executing calibration includes density correction information used for correcting a density value included in the image information so as to reduce an effect of the change in status of the parameter on the quality of an output image.

2. The image forming apparatus according to claim 1, wherein said transmission means includes means for transmitting the information on status of the parameter to the external device which is an originator of the image information.

3. An image forming apparatus which forms an image on a recording medium on the basis of image information, said apparatus comprising:

detection means for detecting change in status of a parameter which affects quality of an output image; and transmission means for transmitting information on status of the parameter to an external device in a case where the change in status of the parameter is detected, wherein the change in status of the parameter detected by said detection means includes change in temperature.

4. An image forming apparatus which forms an image on the basis of image information, comprising:

communication means for communicating with a plurality of external devices via a network;

detection means for detecting change in status of a parameter which affects quality of an output image; and transmission means for transmitting information on status of the parameter to an external device, which is an originator of the image information, out of the plurality of external devices connected to the network, via said communication means in a case where the change in status of the parameter is detected during forming the output image based on the image information.

5. The image forming apparatus according to claim 4 further comprising calibration execution means for executing calibration on the basis of the instruction for executing calibration received from an external device, which is an originator of the image information, out of the external devices connected to the network during forming the output image based on the image information.

6. An image forming apparatus which forms an image on the basis of image information, comprising:

communication means for communicating with one or more external devices via a network;

detection means for detecting change in status of a parameter which affects quality of an output image;

transmission means for transmitting information on status of the parameter to all or a part of the external devices connected to the network via said communication means in a case where the change in status of the parameter is detected; and calibration execution means for executing calibration on the basis of an instruction for executing calibration received from one of the external devices via said communication means, issued in response to the transmission of the information on status of the parameter, wherein the instruction for executing calibration includes density correction information used for correcting a density value included in the image information so as to reduce an effect of the change in status of the parameter on the quality of an output image.

7. The image forming apparatus according to claim 6 further comprising notification means for, when executing calibration by said calibration execution means, sending a message indicating a notice of execution of calibration to all or a part of the external devices connected to the network via said communication means.

8. The image forming apparatus according to claim 6, wherein the change in status of the parameter detected by said detection means includes change in temperature.

9. An image forming apparatus which is to be connected to one or more external devices via a network, said apparatus comprising:

detection means for detecting change in status of an image forming unit of said apparatus;

inquiring means for inquiring an external device, which requested an image forming job currently being performed, whether or not the external device requests to execute calibration, in a case where the change in status of said image forming unit is detected;

reception means for receiving an instruction for executing calibration from the external device; and control means for controlling initiation of calibration on the basis of the received instruction.

10. The image forming apparatus according to claim 9 further comprising notification means for sending a notice, which indicates possibility of performing calibration in said apparatus, to external devices except for the external device which requested the image forming job currently being performed.

11. The image forming apparatus according to claim 9, wherein said inquiring means includes transmission means for transmitting information on status of said image forming unit.

12. The image forming apparatus according to claim 9, wherein the change in status of said image forming unit detected by said detection means includes change in temperature.

13. A control apparatus for controlling an image forming apparatus via a communication path, comprising:

reception means for receiving information on change in status of a parameter which affects quality of an image output by the image forming apparatus, from the image forming apparatus;

deciding means for deciding whether or not to instruct execution of calibration to the image forming apparatus on the basis of the received information; and instruction means for instructing execution of calibration to the image forming apparatus in accordance with a decision by said deciding means, wherein the change in status of the parameter includes change in temperature in the image forming apparatus.

14. A control method for controlling an image forming apparatus which forms an image on a recording medium on the basis of image information, said method comprising:

a detection step of detecting change in status of a parameter which affects quality of an output image; and a transmission step of transmitting information on status of the parameter to an external device in a case where the change in status of the parameter is detected, wherein the instruction for executing calibration includes density correction information used for correcting a density value included in the image information so as to reduce an effect of the change in status of the parameter on the quality of an output image.

15. A control method for controlling an image forming apparatus which forms an image on a recording medium on the basis of image information, said method comprising:

a detection step of detecting change in status of a parameter which affects quality of an output image; and a transmission step of transmitting information on status of the parameter to an external device in a case where the change in status of the parameter is detected;

wherein the change in status of the parameter detected in said detection step includes change in temperature.

16. A control method of controlling an image forming apparatus which is connected to one or more external devices via a network, said method comprising:

a detection step of detecting change in status of an image forming unit of said image forming apparatus;

an inquiring step of inquiring an external device, which requested an image forming job currently being performed, whether or not the external device requests to execute calibration, in a case where the change in status of said image forming unit is detected;

a reception step of receiving an instruction for executing calibration from the external device; and a calibration control step of controlling initiation of calibration on the basis of the received instruction.

17. An image processing method which is applied to an external device connectable to an image forming apparatus which connects a plurality of external devices via a network, said method comprising:

a request step of requesting the image forming apparatus to perform an image forming job;

a reception step of receiving information, indicative of a necessity of calibration of the image forming apparatus, sent from the image forming apparatus when a change in status of the image forming apparatus occurs while the image forming job is being performed in the image forming apparatus; and an output step of outputting information indicative of whether or not to execute calibration of the image forming apparatus.

18. The image processing method according to claim 17, further comprising:

a notification step of notifying a user that it is necessary to execute calibration of the image forming apparatus, in accordance with the received information; and a determination step of determining whether or not to request the image forming apparatus to execute calibration, in accordance with an instruction by the user.

19. The image processing method according to claim 17, further comprising:

a second reception step of receiving information, which indicates a possibility of performing calibration of the image forming apparatus, from the image forming apparatus in a case where change in status of the image forming apparatus occurs while an image forming job, which is requested by another external device, is being performed in the image forming apparatus; and a notification step of notifying a user of a possibility of performing calibration in the image forming apparatus.

* * * * *

UNITED STATES PATENT AND TRADEMARK OFFICE
CERTIFICATE OF CORRECTION

PATENT NO. : 5,933,676
DATED    : August 3, 1999
INVENTOR(S): TAKASHI OHNO

It is certified that error appears in the above-identified patent and that said Letters Patent is hereby corrected as shown below:

COLUMN 5

Line 20, "advise" should read --advises--.

COLUMN 7

Line 61, "controls" should read --control--.

COLUMN 15

Line 16, "detected;" should read --detected,--.

Signed and Sealed this

Nineteenth Day of September, 2000

Attest:

Q. TODD DICKINSON

*Attesting Officer*    *Director of Patents and Trademarks*